Patented Sept. 2, 1952

2,609,355

UNITED STATES PATENT OFFICE 2,609,355

STABILIZATION OF VINYL HALIDE POLYMERS WITH A COMPOSITION CONTAINING AN ESTER OF AN UNSATURATED ALCOHOL

De Loss E. Winkler, Berkeley, Calif., assignor to Shell Development Company, San Francisco, Calif., a corporation of Delaware No Drawing. Application July 19, 1949, Serial No. 105,653

12 Claims. (Cl. 260—45.8)

This invention relates to the stabilization of vinyl halide polymers. More particularly, the invention relates to a novel process for stabilizing vinyl halide polymers against deterioration by light, and to the light stable compositions produced thereby.

Specifically, the invention provides an economical and highly efficient process for stabilizing vinyl halide polymers against deterioration by light, which comprises incorporating with the said vinyl halide polymers a member of the group consisting of the epoxy-containing organic materials and the salts of weak carboxylic acids and in combination therewith an unsaturated ester of a polycarboxylic acid, such as diallyl maleate. The invention further provides light stable compositions comprising the vinyl halide polymers and the above-described combination of stabilizers.

Vinyl halide polymers may be utilized for many useful applications in industry due to their wide range of physical properties and their high resistance to oxidation, organic solvents, acids and alkalies. These polymers find application, for example, in the production of coating compositions, fibers, films, and in the production of shaped articles by various molding techniques. The industrial use of these polymers is considerably restricted, however, by their tendency to decompose in the presence of heat and light, to liberate acid decomposition products. As a result of this decomposition the products become discolored and in many instances lose many of their more desirable physical properties.

It has been proposed to stabilize the vinyl halide polymers against this type of decomposition by the addition thereto of various inorganic or organic compounds, but the results obtained heretofore have not been entirely satisfactory. Many of the suggested compounds, for example, have shown some activity in stabilizing the polymers against decomposition by heat, but have shown little or no effect in stabilizing the same polymers against decomposition caused by exposure to light, especially light that is rich in ultraviolet radiation. This has been found to be particularly true in the case of copolymers of the vinyl halides containing minor quantities of other components, such as vinyl acetate, vinyl butyrate, and the like. The addition of the conventional stabilizers to these copolymers has little effect on stabilizing these materials against decomposition by light and after a short exposure thereto they become discolored and lose many of their important physical properties.

It is an object of the invention, therefore, to provide a method for stabilizing vinyl halide polymers against the effects of light. It is a further object to provide a method for stabilizing copolymers of the vinyl halides against discoloration and decline of mechanical properties caused by the action of light. It is a further object to provide compositions comprising the vinyl halides which possess increased stability toward light. It is a further object to provide compositions comprising the vinyl halide copolymers which can withstand long periods of exposure to light without undergoing any substantial discoloration or loss of physical properties. Other objects and advantages of the invention will be apparent from the detailed description given hereinafter.

It has now been discovered that the vinyl halide polymers may be stabilized against discoloration by light for unexpectedly long periods of time by incorporating with the said polymers a member of the group consisting of the epoxy-containing organic materials and the salts of weak carboxylic acids and in combination therewith an unsaturated ester of a polycarboxylic acid, such as diallyl maleate.

The material to be stabilized by the process of the invention may be any of the homopolymers of the vinyl halides, i. e. compounds of the formula

wherein X is a halogen atom as chlorine and bromine, and any copolymers containing predominant quantities, i. e., at least 70% by weight, of the said vinyl halides. The materials to be copolymerized with the vinyl halides are the polymerizable organic compounds containing at least one $>C=C<$ group in their molecule, such as diethyl fumarate, methyl methacrylate, methacrylonitrile, acrylonitrile, styrene, ethylene, butadiene, allyl alcohol, diallyl ether, divinyl succinate, diallyl phthalate, vinyl benzoate, allyl acetate, diallyl adipate, and the like, and mixtures thereof.

The particularly preferred materials to be stabilized by the process of the invention are the copolymers of the vinyl halides containing from 70% to 98% by weight of the said vinyl halides and from 30% to 2% by weight of polymerizable organic compounds containing at least one >C=C< group in their molecule. Examples of this particularly preferred group of material to be stabilized are a copolymer of 95% vinyl chloride and 5% vinyl acetate, a copolymer of 90% vinyl chloride and 5% diethyl fumarate, a copolymer of 95% vinyl bromide and 10% dibutyl fumarate, a copolymer of 85% vinyl chloride and 15% vinyl propionate, a copolymer of 90% vinyl chloride and 10% acrylonitrile, a copolymer of 88% vinyl bromide and 12% diallyl phthalate, and a copolymer of 80% vinyl chloride, 10% vinyl acetate and 10% vinyl propionate; and the like.

The unsaturated esters to be utilized as stabilizers in the process of the invention are the esters of unsaturated alcohols and the organic polycarboxylic acids. The acids utilized in the production of these esters may be saturated, aliphatic or aromatic and may be substituted or unsubstituted. Examples of such acids are oxalic, malonic, succinic, adipic, pimelic, suberic, azelaic, sebacic, glutaconic, hydromuconic, alpha, beta-diethyl succinic, alpha-butyl glutaric, 2-octene - dioic, phthalic, isophthalic, trimellitic, trimesic, 1,4-cyclohexane-dicarboxylic, naphthalic, diglycolic, dilactic, dihydroacrylic, maleic, fumaric, itaconic, and citroconic acids.

The preferred acids to be employed in producing the unsaturated esters are the dicarboxylic acids possessing at least one olefinic linkage in their molecule. Examples of such acids are chloromaleic acid, alkylated maleic acids, phenyl maleic acid, ethyl maleic acid, benzoyl maleic acid, maleic acid, fumaric acid, glutaconic acid, itaconic acid, citroconic acid, mesaconic acid, alpha-hydromuconic acid, 2-octenedioic acid, 3-dodecenedioic acid, and 2,5-heptadienedioic acid.

The unsaturated alcohols used in producing the unsaturated esters may be any alcohol possessing at least one olefinic linkage not more than four carbon atoms removed from the carbon atom bearing the hydroxyl group. A preferred group of these alcohols are the allyl-type alcohols. Allyl-type alcohols are defined as those alcohols having their hydroxyl group joined to an aliphatic carbon atom which is joined to a second aliphatic carbon that in turn is joined through an olefinic double bond to a third aliphatic carbon atom. Examples of allyl-type alcohols are allyl alcohol, methallyl alcohol, ethallyl alcohol, 2-buten-1-ol, 2-hexen-1-ol, 2-octen-1-ol, 2-chloromethyl - 2 - hexen - 1 - ol and 4-bromo-2-octen-1-ol. Particularly preferred allyl-type alcohols are the aliphatic monohydric allyl-type alcohols containing from 3 to 8 carbon atoms, such as allyl alcohol, methallyl alcohol, 2-buten-1-ol, and 2-octen-1-ol.

Examples of the above-described unsaturated esters are diallyl phthalate, diallyl maleate, allyl vinyl phthalate, diallyl diglycolate, methallyl allyl adipate, di-2-butenyl maleate, di-2-hexenyl azelate, diethallyl glutarate, 2-octenyl vinyl fumarate, divinyl sebacate, dichloro-2-pentenyl dihydroacrylate, methallyl vinyl tartarate, dimethallyl itaconate, ethallyl vinyl succinate, diallyl naphthalate, trimethallyl trimesate, triallyl hemimellitate, and di-2-pentenyl isophthalate.

The preferred unsaturated esters to be employed as stabilizers in the process of the invention are those prepared from the preferred acids, i. e. the dicarboxylic acids possessing at least one olefinic linkage in their molecule, and the preferred unsaturated alcohols, i. e., the aliphatic monohydric allyl-type alcohols containing from 3 to 8 carbon atoms. Examples of this preferred group of unsaturated esters are diallyl maleate, dimethallyl maleate, diethallyl fumarate, 2-butenyl allyl glutaconate, diallyl hydromuconate, diallyl octenedioate, dimethallyl dodecenedioate, and 2-octenyl methallyl heptenedioate.

The above-described unsaturated esters are to be employed in combination with a member of the group consisting of the epoxy-containing organic materials and the salts of the weak carboxylic acids. The expression "epoxy-containing organic materials" is employed throughout the specification and claims to include all those organic materials containing in their molecule at least one

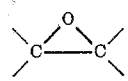

group, i. e. a group containing two aliphatic carbon atoms joined together through a single bond and to an oxygen atom through separate ether linkages. The epoxy-containing organic materials may be aromatic or polymeric and may be saturated, unsaturated, aliphatic, aromatic or alicyclic and may be substituted or unsubstituted with non-interfering substituents, such as the hydroxyl groups, halogen atoms and the like. Examples of epoxy-containing organic materials are epoxypropane, 1-hydroxy-2,3-epoxypropane, 1-chloro-2,3-epoxypropane, 1,2-epoxybutane, 2,3-epoxybutane, 4-chloro-1,2-epoxypentane, allyloxy-2,3-epoxypropane, dodecoxy - 2,3 - epoxypropane, 1,2 - epoxyhexene - 1, phenoxy - 2,3 - epoxypropane, 1,6 - dichloro-2,3-epoxyhexane, butenoxy-2,3-epoxypropane, naphthoxy-2,3 - epoxypentane, 1,4-bis(2,3-epoxypropoxy)benzene, 1,3 - bis(2,3 - epoxypropoxy)benzene, 1,3-bis(3,4-epoxybutoxy)benzene, glycidyl stearate, glycidyl caproate, 1,3,5-tris(3,4-epoxybutoxy)benzene, 1,3 - bis(3,4 - epoxybutoxy) - 5 - (2,3 - epoxypropoxy)benzene, 2,5,7 - tris(2,3-epoxypropoxy)benzene, 4,4' - bis(2,3 - epoxypropoxy)diphenyl ether, 1,3-bis(3,4-epoxypentoxy)benzene, 1,8-bis(2,3-epoxypropoxy)octane, 1,4-bis(2,3 - epoxypropoxy)cyclohexane, 1,3-bis(2,3-epoxybutoxy)cyclopentane, 4,4' - bis(2,3 - epoxypropoxy)diphenyl-dimethylmethane, 4,4'-bis(2-hydroxy - 3,4 - epoxybutoxy)diphenyl-dimethylmethane, 1,3-bis(2,3-epoxypentoxy) - 5 - chlorobenzene, 1,3-bis(2,3-epoxybutoxy)-5-bromobenzene, 1,3-bis(2,3 - epoxypropoxy)5,6-dichlorooctane, 1,4-bis(2,3 - epoxybutoxy) - 2-chlorocyclohexane, 1,4-bis(2,3-epoxypropoxy) - 2-cyclohexene, 1,4-bis(2,3-epoxypentoxy)-3-bromocyclopentane, the polyepoxy polyhydroxy polyethers obtained by reacting a polyhydroxyl alcohol with a polyepoxide, such as 1,3-bis(2-hydroxy-3,4-epoxybutoxy)benzene, 1,4 - bis(2 - hydroxy-4,5-epoxypentoxy)benzene, 1,3 - bis(2 - hydroxy-3,4-epoxybutoxy)propane, 1,2,3 - tri(3,4 - epoxypentoxy)propane, 1,2,3,4 - tetra(2 - hydroxy - 3,4-epoxybutoxy)butane, the reaction product of 1 mole of glycerol and 3 moles of bis(2,3-epoxypropyl)ether, the reaction product of sorbitol and 6 moles of bis(2,3-epoxy-2-methylpropyl)ether, and the reaction product of 1 mole of pentaerythritol and 5 moles of 1,2-epoxy-4-5-epoxypentane.

Further examples are the polymeric epoxides formed by reacting a polyhydric alcohol with a sufficient excess of a polyepoxide or a halogen-containing epoxide, preferably in the presence of an alkaline catalyst. Examples of such polyhydric alcohols are resorcinol, catechol, bisphenol (2,2'-di-p-phenylpropane), 4,4'-dihydroxydiphenylmethane, bis(2,2'-dihydroxydinaphthyl) methane, the polyhydroxy naphthenes, propylene glycol, trimethylene glycol, butylene glycol, glycerol, sorbitol, mannitol, pentaerythritol, and the ethylenically unsaturated or the halogen-containing polyhydric derivatives of any of the above types of polyhydric alcohols. The polyepoxides may be exemplified by 1,2-epoxy-3,4-epoxybutane, 1,2 - epoxy - 4,5 - epoxypentane, bis(2,3 - epoxypropyl) ether, bis(2,3-epoxybutyl) ether, bis(2,3-epoxy-2-methylpropyl) ether. The halogen-containing epoxides are exemplified by epichlorohydrin, 3-chloro-1,2-epoxybutane, 3-bromo-1,2-epoxyhexane, 3-chloro-1,2-epoxyoctane, and the like. Polymers of this type have structures analogous to that illustrated below for the particular case of the reaction between bisphenol and epichlorohydrin,

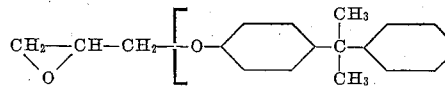 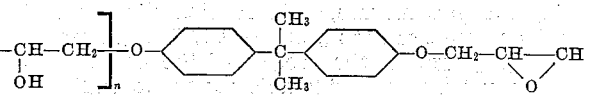

wherein $n$ represents an integer greater than one.

Other examples of this group of materials are the polymers and copolymers of the epoxy-containing monomers possessing at least one polymerizable aliphatic carbon-to-carbon multiple bond, such as an ethylenic group $>C=C<$. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. The monomers may polymerize with themselves or with other ethenoid monomers, particularly the vinyl-type monomers, i. e., those containing at least one $>CH_2=C<$ group, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate.

Illustrative examples of these polymers and copolymers containing the epoxy groups are poly-(allyl 2,3-epoxypropyl ether); poly(2,3-epoxypropyl crotonate); allyl 2,3-epoxypropyl ether-styrene copolymer; methallyl 3,4-epoxybutyl ether-allyl benzoate copolymer; poly(4,5-epoxypentyl crotonate); poly(4,5-epoxypentyl acrylate); poly(2,3 - epoxypropyl cyclohexenoate); poly(vinyl 2,3-epoxypropyl ether); allyl glycidyl ether-vinyl acetate copolymer; poly(methallyl 2,3-epoxypropyl ether); poly(allyl 1-methyl-2,3-epoxypropyl ether); poly(4-glycidyloxy-styrene); poly(1-vinyl-2-pentadecenyl glycidyl ether); and poly(tiglyl 3,4-epoxybutyl ether).

A particularly preferred group of epoxy-containing organic materials to be employed in the process of the invention are the members of the group consisting of the organic compounds possessing a plurality of epoxyalkoxy radicals, preferably 2 to 4, joined to an organic radical which contains from one to two aromatic rings, organic compounds possessing a plurality of epoxyhydroxyalkoxy radicals, preferably 2 to 4, joined to an organic radical containing from one to two aromatic rings, the polyepoxy-containing polymeric reaction product of an aromatic polyhydric alcohol and epihalohydrin, the polyepoxy-containing polymeric reaction product of an aliphatic polyhydric alcohol and epihalohydrin, the polyepoxy-containing polymeric reaction product of an aromatic polyhydric alcohol and a polyepoxide compound, the polyepoxy-containing polymeric reaction product of an aliphatic polyhydric alcohol and a polyepoxide compound, the polymers of the epoxy-containing monomers possessing at least one polymerizable aliphatic carbon-to-carbon multiple bond prepared in the absence of alkaline or acidic catalysts, and copolymers of the foregoing epoxy-containing monomers and a monomer containing at least one $CH_2=C<$ prepared in the absence of alkaline or acidic catalysts. The expression "epoxy-alkoxy radical" refers to an alkoxy radical substituted with an epoxy group. The expression "epoxyhydroxyalkoxy radical" refers to an alkoxy radical substituted with an hydroxyl group and an epoxy group. Illustrative examples of this particularly preferred group of compounds are 1,4-bis(2,3-epoxypropoxy)benzene, 1,3-bis(2,3-epoxypropoxy)benzene, 1,3-bis(2,3-epoxybutoxy)benzene, 4,4'-bis(2,3-epoxypropoxy)diphenyldimethylmethane, 1,3-bis(2-hydroxy-3,4-epoxybutoxy)benzene, 1,2,3-tri(2-hydroxy-3,4-epoxypentoxy)naphthalene, the polymer obtained by reacting resorcinol with epichlorohydrin, the polymer prepared by reacting resorcinol with bis(2,3-epoxypropyl) ether, the polymer prepared by reacting sorbitol with epichlorohydrin, poly-(allyl 2,3-epoxypropyl ether) and poly(2,3-epoxypropyl crotonate).

The most suitable epoxy-containing organic materials are those having a low degree of evaporation from the stabilized compositions, e. g. those having a boiling point above 300° C.

The preparation of many of the above-described epoxy-containing organic materials is described in the copending application of De Nie and Voorthuis, Serial No. 774,660, filed September 17, 1947, the copending application of Werner and Farenhorst, Serial No. 33,914, filed June 18, 1948, and the copending application of Shokal and Winkler, Serial No. 34,346, filed July 21, 1948.

Additives that may be used in place of the above-described epoxy-containing compounds are the salts of weak carboxylic acids, preferably containing more than 6 carbon atoms. The acids employed in producing these salts may be saturated, unsaturated, aliphatic, aromatic or alicyclic, and may contain one or more carboxyl groups. Examples of such acids are caproic acid, caprylic acid, pelargonic acid, capric acid, lauric acid, myristic acid, palmitic acid, stearic acid, arachidic acid, behemic acid, azelaic acid, sebacic acid, brassylic acid, hydromuconic acid, phthalic acid, naphthenic acid, cyclohexanoic acid, salicyclic acid, gallic acid, cinnamic acid, oleic acid, linoleic aid, lanoceric acid, lanopalmic acid, cerotic acid, lanomyristic acid, lanoarachidic acid, and hexoacosanoic acid. Any of the various metals may be employed in producing the salts of the above-described acids, such as calcium, strontium, barium, lead, magnesium and cadmium. If the acid employed in producing the salt is a polycarboxylic acid only one of the carboxyl groups need be reacted with the metal, the remaining carboxyl groups being esterified with alcohols, such as butyl alcohol, octyl alcohol, etc.

Examples of the salts of the carboxylic acids that may be employed in the process of the invention are calcium stearate, lead resinolate, calcium diisopropyl salicylate, magnesium diisopropyl salicylate, the compounds obtained by heating the last two mentioned compounds so that a chelate ring is formed between the hydroxyl group and the metal, calcium octyl salicylate, strontium naphthenate, cadmium naphthenate, lead stearyl salicylate, lithium stearate, lead palmitate, calcium behemate, calcium azelate, lead lanocerate, strontium salicylate, lead cerotate, calcium lanomyristate, and cadmium tartarate.

Particularly preferred salts to be employed in the process are the salts of the alkaline earth metals and weak carboxylic acids containing from 6 to 30 carbon atoms, such as naphthenic acid, stearic acid, cerotic acid, melissic acid, palmitic acid, sorbic acid, isophthalic acid and phthalic acid. Examples of these preferred salts are strontium naphthenate, cadmium stearate, strontium cerotate, strontium melissate, calcium sorbitate, barium palmitate, and strontium phthalate.

The amount of each group of stabilizing agent to be employed in the process of the invention will vary over a considerable range depending upon the particular agents selected and the material to be stabilized. In most cases the amount of the first group of stabilizers, i. e., the unsaturated esters, will vary from 0.01% to 4% by weight of the material being stabilized with a preferred range varying from 0.05% to 2% by weight of the material stabilized. The amount of the second group of stabilizing agent, i. e., the epoxy-containing organic materials or salts of weak carboxylic acids, will generally vary from 0.01% to 5% by weight of material being stabilized with a preferred range varying from 0.05% to 3% by weight. The ratio of the two types of stabilizing agents to be employed to obtain the best results vary considerably with the various agents and material to be stabilized and it is best to select such ratios for each individual case by a few routine determinations.

The stabilizing agents may be incorporated into the various compositions by a variety of suitable methods. The agents may be added singly in any order or they may be added in admixture with one another. The agents may be added in a dissolved, suspended or pulverulent state to the desired high molecular weight organic materials which in turn may be in a dissolved or solid state. If the material to be stabilized is a polymeric material the agents may be introduced as solutions or dispersions in one or more of the reactants prior to the polymerization reaction, or they may be introduced subsequent to the polymerization reaction by any of the conventional methods for the incorporation of additives into plastic compositions, such as by mixing the resin and stabilizers in a masticator or on heated differential rolls.

Modifying agents, such as plasticizers, pigments and fillers may be added to the material to be stabilized before, at the same time as, or after the addition of the stabilizing agents.

The following examples are cited to illustrate the effectiveness of the process of the invention in stabilizing the vinyl halide polymers against deterioration by light. It should be understood, however, that the examples are for the purpose of illustration and the invention is not to be regarded as being limited to any of the specific conditions cited therein. All percentages indicated in the examples are based on the weight of the material being stabilized.

*Example I*

(a) About 100 parts of a copolymer of 95% vinyl chloride and 5% vinyl acetate were mixed with 50 parts of dioctyl phthalate and 2 parts of poly(allyl glycidyl ether) and the mixture milled for fifteen minutes on a roll mill with roll temperature between 130° C. and 150° C. The sheets from the mill were then molded for two minutes at 160° C. These sheets were exposed to monochromatic light of predominantly 5000 Å wave length for 340 hours. At the end of this period the sheets were highly discolored.

(b) About 100 parts of the copolymer of 95% vinyl chloride and 5% vinyl acetate were mixed with 50 parts of dioctyl phthalate, 2 parts of poly(allyl glycidyl ether) and 2 parts of diallyl maleate and the mixture milled and molded as shown in (a) above. The resulting sheets were then exposed to the monochromatic light of predominantly 5000 Å wave length for 340 hours. At the end of this period the sheets were entirely colorless. This combination of stabilizers appeared to give the vinyl chloride-vinyl acetate copolymer complete protection against decomposition by light.

*Example II*

(a) About 100 parts of a copolymer of 95% vinyl chloride and 5% vinyl acetate were mixed with 50 parts of dioctyl phthalate and 2 parts of a polymeric reaction product of bisphenol and epichlorohydrin (having a structure similar to the one illustrated on page 8) and the mixture milled for fifteen minutes on a roll mill with roll temperature between 130° C. and 150° C. The sheets from the mill were then exposed to the light of 5000 Å wave length for 340 hours. At the end of this period the sheets were greatly discolored.

(b) About 100 parts of the vinyl chloride-vinyl acetate copolymer were mixed with 50 parts of dioctyl phthalate, 2 parts of the polymeric reaction product of bisphenol and epichlorohydrin utilized in (a) above, and 2 parts of diallyl maleate and the mixture milled as described above. The sheets from the mill were then exposed to the light of 5000 Å wave length for 340 hours. At the end of this period the sheets were entirely colorless.

*Example III*

About 100 parts of the above-described copolymer of vinyl chloride and vinyl acetate were mixed with 50 parts of dioctyl phthalate, 2 parts of poly(allyl glycidyl ether) and 2 parts of diallyl phthalate and the mixture milled and molded as shown in Example I. The sheets were then exposed to light of 5000 Å wave length for 340 hours. At the end of this period the sheets were colorless.

As shown in Example I (a) sheets of the copolymer containing only the poly(allyl glycidyl ether) were highly discolored after the above-described treatment.

*Example IV*

About 100 parts of the above-described copolymer of vinyl chloride and vinyl acetate were mixed with 50 parts of dioctyl phthalate, 2 parts of strontium naphthenate and 2 parts of diallyl maleate. The resulting mixture was milled and molded as shown in Example I and then exposed to light of 5000 Å wave length. At the end of 340 hours of exposure the sheets were substantially colorless. Sheets containing only the strontium naphthenate were greatly discolored when subjected to the above-described treatment.

*Example V*

About 100 parts of polyvinyl chloride is mixed with 50 parts of dioctyl phthalate, 2 parts of cadmium naphthenate and 2 parts of dimethallyl fumarate. The resulting mixture is milled and molded as shown in Example I and then exposed to light of wave length of 5000 Å. At the end of 340 hours the exposed sheets are quite colorless as compared to a similarly treated composition containing only the cadmium naphthenate.

*Example VI*

About 100 parts of a copolymer of 90% vinyl chloride and 10% diethyl fumarate is mixed with 50 parts of dioctyl phthalate, 2 parts of 1,3-bis-(2,3-epoxypropoxy)benzene and 2 parts of diallyl phthalate. The resulting mixture is milled and molded as shown in Example I and then exposed to light of wave length of 5000 Å. At the end of 340 hours the exposed sheets possess far less discoloration than a similarly treated composition containing only 1,3-bis(2,3-epoxypropoxy)-benzene.

*Example VII*

About 100 parts of a copolymer of 90% vinyl chloride and 10% vinyl butyrate is mixed with 50 parts of dioctyl phthalate, 2 parts of strontium stearate and 2 parts of di-2-hexenyl maleate. The resulting mixture is milled and molded as shown in Example I and then exposed to light of wave length of 5000 Å. At the end of 340 hours the exposed sheets possess little discoloration.

*Example VIII*

About 100 parts of polyvinyl chloride is mixed with 50 parts of dioctyl phthalate, 2 parts of diallyl maleate, and 2 parts of poly(allyl glycidyl ether), and the mixture milled and molded as shown in Example I. The resulting sheets are then exposed to light of 5000 Å for 340 hours. At the end of this period the sheets possess little discoloration.

I claim as my invention:

1. A process for stabilizing a copolymer of 95% vinyl chloride and 5% vinyl acetate against deterioration by light which comprises incorporating therewith 2% by weight of diallyl maleate and 2% by weight of poly(allyl glycidyl ether).

2. A process for stabilizing a copolymer of 70% to 98% vinyl chloride and 30% to 2% vinyl acetate against deterioration by light which comprises incorporating therewith from 0.1% to 5% by weight of diallyl maleate and from 0.1% to 5% by weight of a polymeric reaction product of bisphenol and epichlorohydrin.

3. A process for stabilizing a copolymer of 70% to 98% vinyl chloride and 30% to 2% vinyl acetate against the effects of light which comprises incorporating therewith from 0.1% to 5% by weight of diallyl maleate and from 0.1% to 5% by weight of strontium naphthenate.

4. A process for stabilizing polyvinyl chloride against deterioration by light which comprises incorporating therewith from 0.1% to 5% by weight of diallyl maleate and from 0.1% to 5% by weight of poly(allyl glycidyl ether).

5. A process for stabilizing a copolymer of vinyl chloride and a polymerizable organic compound containing at least one >C=C< group containing at least 70% vinyl chloride against the effects of light which comprises incorporating therewith 0.1% to 5% of an ester of (1) an unsaturated alcohol possessing at least one olefinic linkage not more than 4 carbon atoms removed from the carbon atom bearing the hydroxyl group, and (2) a dicarboxylic acid containing one olefinic linkage, and 0.1% to 5% of a member of the group consisting of the epoxy-containing organic materials and salts of carboxylic acids having an ionization constant that does not exceed that of phthalic acid and the alkaline earth metals.

6. A process for stabilizing a vinyl chloride polymer containing at least 70% by weight of vinyl chloride against the effects of light which comprises incorporating therewith additives consisting of an ester of (1) an unsaturated alcohol possessing at least one olefinic linkage not more than 4 carbon atoms removed from the carbon atom bearing the hydroxyl group, and (2) a polycarboxylic acid, and a member of the group consisting of the epoxy-containing organic materials and the salts of the carboxylic acids having an ionization constant that does not exceed that of phthalic acid, the amounts of the additives being so proportioned as to render the said materials stable to light.

7. As a composition of matter, a copolymer of 95% vinyl chloride and 5% vinyl acetate containing 2% by weight of diallyl maleate and 2% by weight of poly(allyl glycidyl ether) dispersed therein, said composition being stabilized against deterioration by light.

8. As a composition of matter, a copolymer of 70% to 98% vinyl chloride and 30% to 2% vinyl acetate containing from 0.1% to 5% by weight of diallyl maleate and from 0.1% to 5% by weight of a polymeric reaction product of bisphenol and epichlorohydrin dispersed therein.

9. As a composition of matter, a copolymer of 70% to 98% vinyl chloride and 30% to 2% vinyl acetate containing from 0.1% to 5% by weight of diallyl maleate and from 0.1% to 5% by weight of strontium naphthenate dispersed therein.

10. As a composition of matter, a copolymer of 70% to 98% by weight of vinyl chloride and from 30% to 2% by weight of a polymerizable organic compound containing at least one >C=C< group, containing from 0.1% to 5% by weight of diallyl maleate and from 0.1% to 5% by weight of a member of the group consisting of the epoxy-containing organic materials and a salt of an alkaline earth metal and a carboxylic acid having an ionization constant that does not exceed that of phthalic acid.

11. As a composition of matter, a vinyl chloride polymer containing at least 70% by weight of vinyl chloride containing an ester of (1) an unsaturated alcohol possessing at least one olefinic linkage not more than 4 carbon atoms removed from the carbon atom bearing the hydroxyl group, and (2) a dicarboxylic acid containing an olefinic linkage, and at least one member of the group consisting of the epoxy-containing organic materials and the salts of carboxylic acids having an ionization constant that does not exceed that of phthalic acid, the amount of the additives being so proportioned as to render the said materials stable to light.

12. As a composition of matter, a vinyl chloride polymer containing at least 70% by weight of vinyl chloride containing an ester of (1) an unsaturated alcohol possessing at least one olefinic linkage not more than 4 carbon atoms removed from the carbon atom bearing the hydroxyl group, and (2) a polycarboxylic acid, and a member of the group consisting of the epoxy-containing organic materials and the salts of carboxylic acids having an ionization constant that does not exceed that of phthalic acid, the amount of the additives being so proportioned as to render the said materials stable to light.

DE LOSS E. WINKLER.

REFERENCES CITED

The following references are of record in the file of this patent:

UNITED STATES PATENTS

| Number | Name | Date |
|---|---|---|
| 1,932,889 | Groff | Oct. 31, 1933 |
| 2,313,757 | Matheson et al. | Mar. 16, 1943 |
| 2,404,781 | Arnold et al. | July 30, 1946 |
| 2,456,216 | Richter | Dec. 14, 1948 |